United States Patent
Vitale et al.

(10) Patent No.: US 10,063,602 B2
(45) Date of Patent: Aug. 28, 2018

(54) SYSTEM, METHOD AND APPARATUS FOR CONTENT EAVESDROPPING

(71) Applicants: Thomas Vitale, Oak Hill, VA (US); Robert Wann, Alexandria, VA (US)

(72) Inventors: Thomas Vitale, Oak Hill, VA (US); Robert Wann, Alexandria, VA (US)

(73) Assignee: Geekin Ventures, Inc., Camden, DE (US)

( * ) Notice: Subject to any disclaimer, the term of this patent is extended or adjusted under 35 U.S.C. 154(b) by 468 days.

(21) Appl. No.: 14/209,793

(22) Filed: Mar. 13, 2014

(65) Prior Publication Data

US 2014/0280780 A1   Sep. 18, 2014

Related U.S. Application Data

(60) Provisional application No. 61/784,468, filed on Mar. 14, 2013.

(51) Int. Cl.
| | |
|---|---|
| *H04L 29/06* | (2006.01) |
| *H04L 12/18* | (2006.01) |
| *H04N 21/242* | (2011.01) |
| *H04N 21/43* | (2011.01) |
| *H04N 21/4788* | (2011.01) |

(52) U.S. Cl.
CPC ...... *H04L 65/4007* (2013.01); *H04L 12/1822* (2013.01); *H04L 65/4038* (2013.01); *H04N 21/242* (2013.01); *H04N 21/4307* (2013.01); *H04N 21/4788* (2013.01)

(58) Field of Classification Search
CPC ........ G06Q 50/01; H04H 20/38; H04H 20/61; H04N 21/2668; H04N 21/8113; H04N 21/2743; H04W 4/06; H04W 84/18; H04W 88/06

See application file for complete search history.

(56) References Cited

U.S. PATENT DOCUMENTS

| | | | |
|---|---|---|---|
| 2007/0197160 A1 | 8/2007 | Health et al. | |
| 2007/0288978 A1* | 12/2007 | Pizzurro | H04N 7/17336 725/112 |
| 2011/0082807 A1 | 4/2011 | Parehk et al. | |
| 2012/0028434 A1 | 8/2012 | Lee et al. | |
| 2014/0213227 A1* | 7/2014 | Rao | H04W 4/206 455/414.3 |

OTHER PUBLICATIONS

Written Opinion in corresponding PCT/US2014/026528.

* cited by examiner

*Primary Examiner* — Arvin Eskandarnia
(74) *Attorney, Agent, or Firm* — Gregory Finch; Finch Paolino, LLC

(57) ABSTRACT

Techniques, devices, systems and methods to facilitate the ability of a user to simultaneously and substantially in real time transmit content to others, like a radio, whether a person adjacent them or a world away, and access the streaming content of others in real time. Through the synchronization of delivered content, two or more users can have a shared experience.

16 Claims, 5 Drawing Sheets

US 10,063,602 B2

SYSTEM, METHOD AND APPARATUS FOR CONTENT EAVESDROPPING

RELATED PATENT APPLICATION

The present application is a non-provisional of U.S. Provisional Patent Application Ser. No. 61/784,468, the disclosure of which is incorporated herein by reference.

BACKGROUND OF THE INVENTION

The explosive growth of social media has opened new modalities of communication and sharing between individuals, groups, communities, nations and the world. Services, such as Facebook and Twitter, expand the capability of the individual to broadly share their thoughts with others.

Now, users of social media can post or share text, photos, movies and other content with ease, and access the shared content of others with great facility.

With further advances in technology and bandwidth in telecommunications, ever more expansive degrees of inter-communications are possible, limited it seems only by the human imagination.

There is, therefore, a need for devices, networks and methodologies to facilitate better communication with others on a live or streaming basis, thereby more directly sharing personal tastes, thoughts and dreams with others in oral, written, visual and other content means and combinations.

There is, therefore, a need for social media users to share content simultaneously with one other person, a group of people, or perhaps the world.

SUMMARY

The present invention is directed to techniques, devices, systems and methods to facilitate the ability of a user to simultaneously and substantially in real time transmit content to others, like a radio, whether a person adjacent them or a world away, and access the streaming content of others in real time. Through the synchronization of delivered content, two or more users can have a shared experience.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
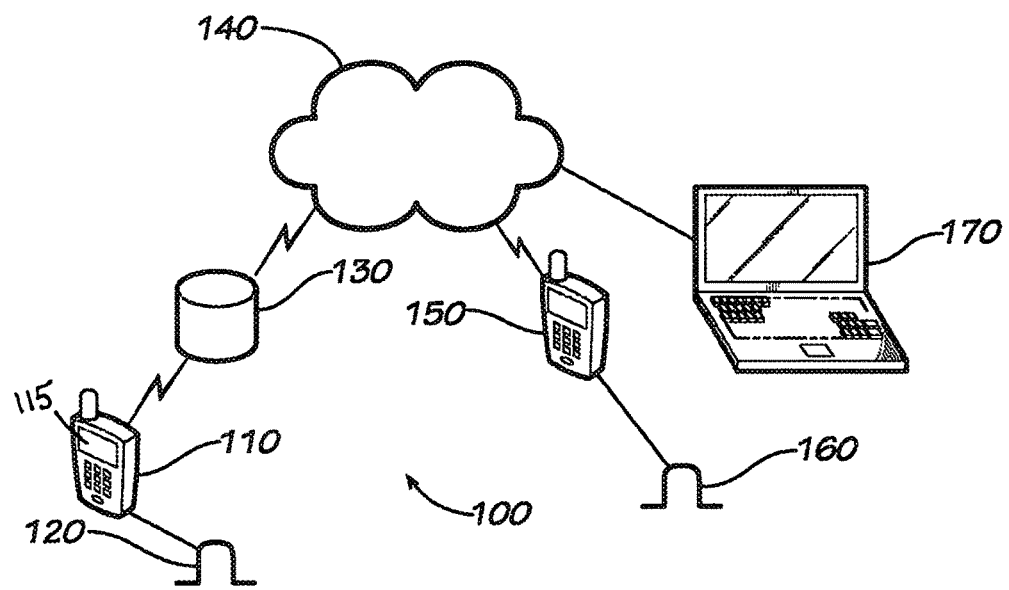
FIG. 1 is a schematic view of a general telecommunications system and methodology configuration pursuant to a first embodiment of the present invention.

With reference now to FIG. 1 of the DRAWINGS, there is illustrated therein general schematic view of a network or telecommunications system, generally designated by the reference numeral 100, which may be employed to implement the principles of the present invention.

As shown in FIG. 1, a user of a first mobile phone 110 has a headset 120, removably attached to the phone 110 for listening to phone calls, music or other oral communications or content. As also shown, the mobile phone 110 has a display 115, upon which content may be displayed, as is understood in the art. As discussed, the user wishes to share information or content with others, and may initiate such communication through said mobile phone 110.

It should be understood that one practicing the principles of the present invention may employ the mobile phone 110 or other like-operating devices. For example, instead of a phone, the user employs an IPad or a desktop PC or other such device that has telecommunications capabilities to share information, whether wirelessly or via a wireline system. For example, the user wishes to share the content they are enjoying, such as a song, to another. Using the display 115, a touch screen selector, a button on the mobile phone, or voice command, the user initiates the transmission of that song, e.g., via a wireless transmission for dynamic sharing.

With further reference to FIG. 1, the wireless signal is received by a local telecommunications base station, generally designated by the reference numeral 130, and forwarded, via phone lines or perhaps through the Internet 140, i.e., a telecommunications network, to the destination areas. The recipients, who may be widely dispersed, receive the signal from local telecommunications providers or perhaps along a landline, as described.

It should be understood that the user of the mobile device 110 designates these recipients in some fashion or subscribes to a group. They may be friends, colleagues or other groupings. In a preferred embodiment of the present invention, the recipients and the user are subscribers to a service offering the present invention, generally represented by the reference numeral 100. Thus, the user of the mobile phone 110 may login to the service (or otherwise have it available and in an "on" mode) to make their content available to the recipients, such as another mobile phone user, generally designated by the reference numeral 150, listening on their own headphones 160, or a PC user, generally designated by the reference numeral 170. In other words, the user 110 broadcasts their content, e.g., a song, a commentary, and admixture of song and comment, a video or any other content to the designated recipients in a gesture of a dynamic sharing of an experience, i.e., of that content.

Accordingly, the user of the mobile phone 110 may wish to hear or participate in the content usage of others as part of a dynamic and interactive sharing experience. Thus, the user would log into the subscriber service, and select the feed or simultaneous broadcast of another, which would be downloaded in substantially or true real time for the user's 110 enjoyment. For example, the user of mobile phone 110 may tap into the broadcast of the user of mobile phone 150, PC 170 or any other subscriber, enjoying what they are enjoying, experiencing what they are experiencing, sharing in their life simultaneously together. In other words, the present invention facilitates permitted or allowed eavesdropping. What was and is a social faux pas in oral, personal communications is encouraged in the more anonymous, electronic communications of present day, which many people prefer.

Further, the eavesdropping can be chained, such as where you are listening to a certain celebrity, friend, or artist, and they are listening to another celebrity, friend or artist. Ultimately, one is listening to the originating person listened to. For example, if a user is listening to Michael Jordan and another user is listening into the first user, then the second user is really listening to Michael Jordan, albeit feeding off the phone or other device of the first user. In this fashion, one device will only feed off of another one device or chain so that the system will never crash. However, the second user's phone will say Michael Jordan, and list that user's friends, who are also listening to Michael Jordan.

In an exemplary usage of the present invention, a popular athlete or Olympian is warming up for a game or contest. To share in the experience, the athlete has equipment on or near them transmitting the experience, e.g., a microphone or webcam. Perhaps, the live game experience itself can be captured. A football player or race car driver may thus transmit and share their experience during a game, orally and visually, with others, who would vicariously live through the experience, a shared experience.

Another example, two friends are travelling and one desires to hear the other's playlist. Through the social media sharing mechanism of the present invention this becomes possible with both friends subscribing to the protocol or paradigm set forth herein. Further, a user may wish to share a favorite song or portion thereof with others. An upcoming band may wish to promote their own works through such sharing. A record label or other promoter can likewise appeal to a mass market audience of the subscribers to share a song, a concert experience or other content in an effort to increase sales.

The instant invention permits one to drop in on their friends, cultural icons, government officials or others so broadcasting, a form of electronic voyeurism encouraged by those likewise transmitting, and consenting to the shared experience. It should be understood that this eavesdropping and voyeurism is only permitted between subscribers or through consent. Since privacy laws place restrictions on much of this type of behavior, the users must expressly consent to become part of this sharing experience, something many people are willing and already doing.

Figure 2:
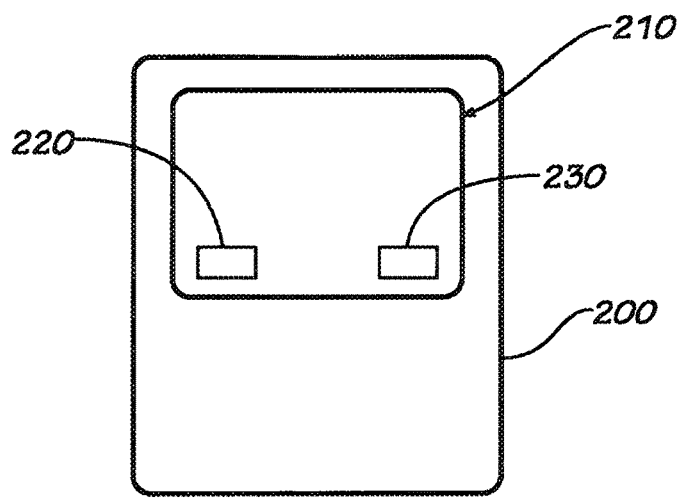
FIG. 2 is an exemplary configuration of a mobile device as shown in FIG. 1.

In a preferred embodiment, a consumer downloads an app or applet that enables the services of the instant invention, with a sharing content authorization warning and consent box to check, e.g., at the outlet of subscribing. For example, with reference now to FIG. 2 of the DRAWINGS, there is shown a mobile phone, generally designated by the reference numeral 200, with a display 210. An icon 220 enables the service. For example, enabling the service permits that user to engage in the broadcasting, as described. Users will either be active, e.g., listening to music, or inactive, i.e., opting in or opting out of the service when sharing is not desired. Users can enable sharing, i.e., broadcasting, or hide this capability, while maintaining the ability to view and listen to others' broadcasting. With some celebrity worshippers, their followers could passively listen in for many hours each day. With the rise of celebrity television reality shows, the services envisioned in the instant invention are quite feasible and desired by many.

In practice in one embodiment of the present invention, the user so enabling the broadcasting capabilities, e.g., the mobile phone 110 user in FIG. 1 by pressing the icon 220, can select from a list of others' broadcasts, an activity feed, such as that emanating from the mobile phone 150 user, the user of the PC 170 or another. The user 110 will thus hear, simultaneously or substantially so, what the user 150 is hearing or seeing. Like a radio, the user 110 dials into the broadcast stream of user 150, and taps into the signal at that point, vicariously experiencing the life of another. As will be discussed in more detail hereinbelow, the content and the sync information are separately forwarded to the listener(s).

It should be understood that the avoidance of copyright law violations is critical to the promulgation of this technology and methodology. Thus, as with the Snapchat photo messaging service, no copies are made and all content is erased. However, contemporaneously with the broadcast, additional content may be transmitted, such as the names of a song, the artist and other information related to the content being viewed. Further, other services, such as shazam, permit the identification of a song via analysis of a small sample thereof, thereby providing information about a song automatically when absent with the song signal. This further enables the potential of the viewer to purchase that content, knowing the identity thereof. It should be understood that measures may be taken, e.g., a copyrighted material identification app on the phone 150 may alter the material or otherwise prevent an unauthorized transmission.

With reference again to FIG. 1, the user 110 or 150 may exchange messages, between the two or them or shared with all or part of the subscribers, such as text messages, permitting contemporaneous commentary on the content being heard or seen. A group could thus, with a broadcaster of the content, share a common experience, such as listening to music, visiting a museum, an art show, a walk in nature, dinner or any number of potential interactive events, perhaps even private moments, e.g., a wedding or first date. The degree of personal sharing of intimate details is a variable. As is well understood to those of skill in the art, the respective devices within the telecommunications system have the requisite capability to so bundle or integrate different data streams and signals together into one feed. In this fashion, the sharing of content resembles an interactive blog.

With the ubiquity of other services, such as Facebook and Twitter, the instant invention is preferably integrated with these services, as well as other social media, thereby further expanding the communications capability. Also, the devices employing the instant invention are readily interconnected, despite different operating systems, by software, such as the portable operating systems interface (POSIX) and other IEEE standard protocols that maintain the compatibility between different operating systems, such as through an Application Program Interface (API).

The instant invention offers a wide variety of new experience potentials. For example, users may be in cars adjacent on the highway. One driver (or preferably a passenger) may access the playlist of another driver, e.g., through geo-location capabilities, which is another embodiment of the present invention, i.e., local broadcasts. Similarly, subscribers within a city or other locale may be found, opening up new possibilities of a more limited scope sharing. Those subscribers within a specific area may be so identified by their physical proximity, and access granted, e.g., via Bluetooth, creating a microexperience.

In another aspect of the present invention, a user, such as the mobile phone 110 user in FIG. 1, while listening to a song or video or other content, can record that content, such as a song clip, and forward that to others, perhaps with a comment. Others receiving the clip could comment also. Preferably, as in Snapchat, the song or movie or other more proprietary content will have a time limit, such as 20 seconds, and then destroyed. To so record, the user may press a button 230 on the mobile phone 200 shown in FIG. 2. Likewise, a user may associate a favorite song with a video, creating a music video, which is then shared to others, perhaps with a time limit, as discussed.

Although other multimedia platforms, e.g., YouTube, Facebook, Soundcloud, Spotify, etc., offer services, each of them have more limited sharing experience and sharing features, such as providing links to content. None of the existing services provide the enhanced experiential features of the instant invention, i.e., a degree of sharing where users may listen in on what other users are playing or seeing at the same time. Additional streaming programs, such as Podcasts and Internet radio, allow respective users to listen together on a single broadcast, where a single user controls the content being streamed. Further, these programs generally have a high learning curve and require higher computing resources to implement, especially on mobile devices. The instant invention provides a novel solution to these and the other problems noted.

Figure 3:
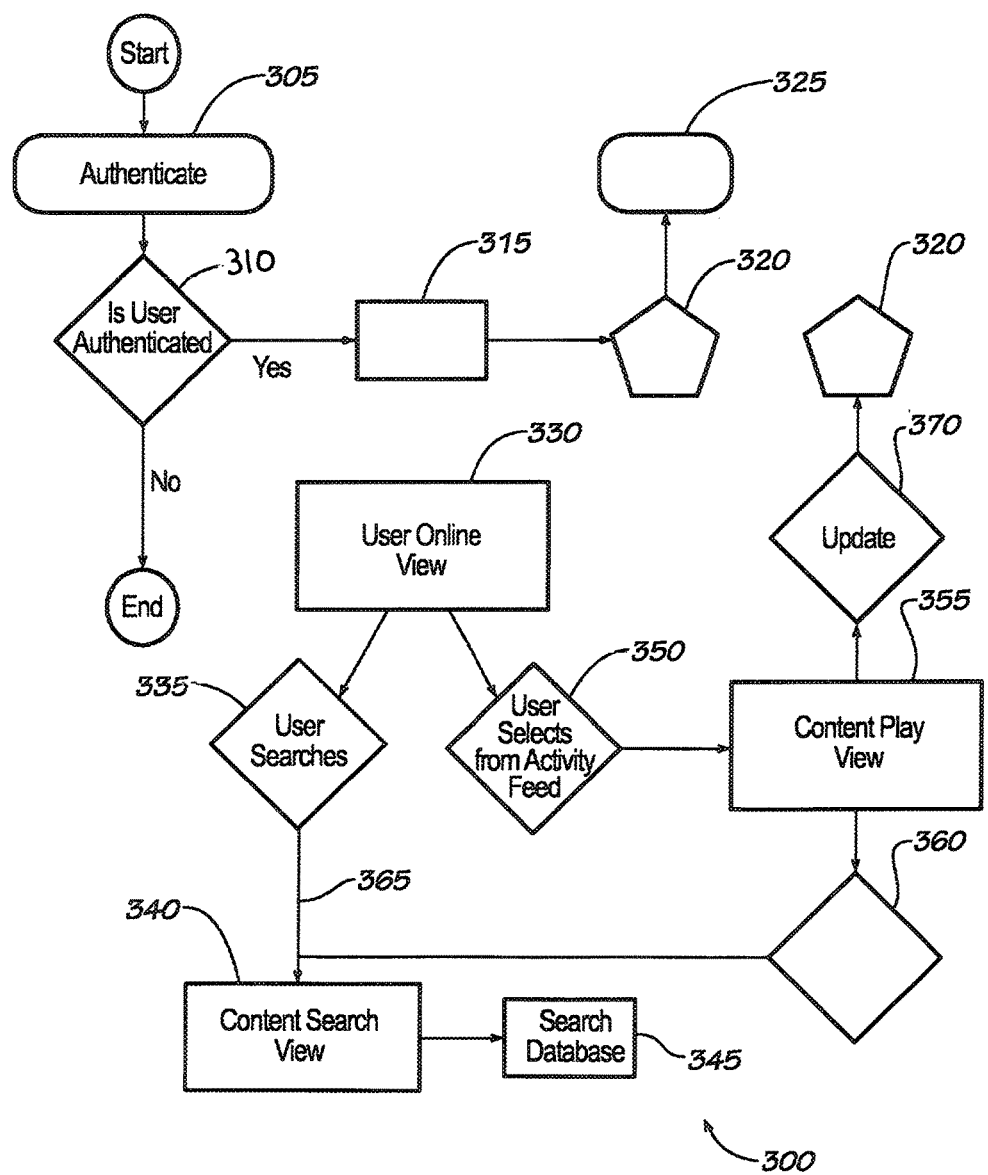
FIG. 3 is a representative process flowchart illustrating some of the functionality of the present invention.

Turning now to FIG. 3 of the DRAWINGS, there is shown a representative diagram or flow chart, generally designated by the reference numeral 300, illustrating a presently preferred process flow, by which a person or user first authenticates with a multimedia content provider, communicates between a user management server or system, then either selects to become a 'broadcaster' or selects an already existing 'broadcaster' to become a 'listener.'

As shown in FIG. 3, a user authenticates with login credentials, generally designated by the reference numeral 305, and, after such authentication 310 is granted, requests access to multimedia content from the provider, generally designated by the reference numeral 315. It should be understood that the authentication for content is with other services, such as those having content, e.g., SoundCloud or other such providers, which act in concert with the user control aspects of the present invention. Upon entry into the system, user profile data for that entrant is sent to a user management server, generally designated by the reference numeral 320. If a new user or registrant, the system 300 generates a new user profile 325, or, in the case of existing registrant users, updates the server 320 with that user's current activity.

It should be understood that the content sent to the management server 320 includes, but is not limited to, identifiers for current songs, if any is playing, a server-generated time stamp, and profile information. As discussed, no content is sent to the management server 320. As indicated, a new user is generated 325 on the user management server 320 if the user does not already exist. Where the user exists, the information on the server 320 is updated with the newest information about that user. It should be understood that the system 300 may poll its users as to their status and for updates.

As indicated, users of the system 300 may be broadcasters or listeners. At a subscriber screen, generally designated by the reference numeral 330, the user selects whether to be a broadcaster or a listener. If an online broadcaster is selected, generally designated by the reference numeral 335, the user may choose to search for a specific multimedia file 340, e.g., performing a search of content on a multimedia or other content service provider, such as SoundCloud for songs, generally designated by the reference numeral 345, with the results of which returned to the user, as illustrated, for separate download.

Alternatively, the user may wish to be a passive listener. As such, the user may select from a list of broadcasters in an activity feed, generally designated by the reference numeral 350 and described further hereinbelow. Thus, the user, as a listener, may join a selected broadcaster session, receive the indicated content from the content media provider, and be synchronized with the broadcaster with data from the user management server 320. This multimedia playback view, where the listener requests the playback position from the user management server 320 and is returned the appropriate playback positioning the device must seek to in order to be synchronized with the broadcaster, is generally designated by the reference numeral 355 and described further hereinbelow. For example, if a selected broadcaster is playing a song, the identity of that song, the playback position of the song, and other data about the song or content is sent to the user, thereby allowing the system 300 to sync with the feed from the broadcaster selected. As illustrated, the user may browse for other content while the aforesaid music is playing, generally designed by the reference numeral 360. The activities of the multitasking user are sent back to the subscriber screen 330, and all new activities of the user in the system 300, generally designated by the reference numeral 370, are forwarded to the aforementioned user management server 320, where that user's activities are updated and recorded.

Figure 4:
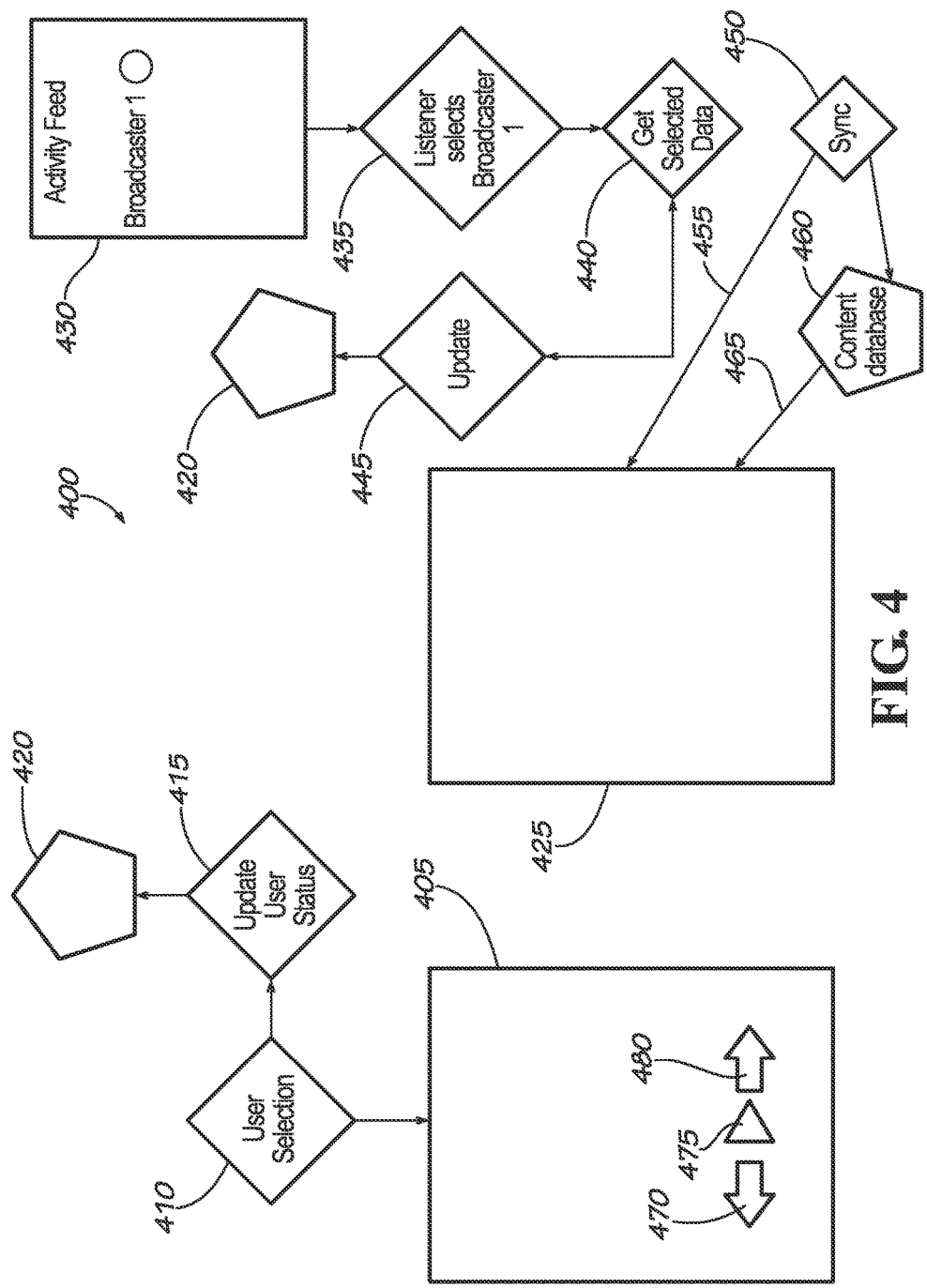
FIG. 4 is another representative process flowchart and diagram illustrating principles of the instant invention.

With reference now to FIG. 4 of the DRAWINGS, there is shown a diagram illustrating a process by which a client device requests information about what multimedia to retrieve from the multimedia server and requests playback position from the user management server. In this figure, a broadcaster screen is shown 405, which corresponds to the aforementioned subscriber screen 330 where the user selects to become a broadcaster. As shown, the broadcasting user selects a song (or any other content as discussed), which then plays or is broadcast, generally designated by the reference numeral 410, and this activity is sent on to the aforementioned user management server 320, generally designated by the reference numeral 415, where the requisite databases of that user's activities are updated, including the information on the song being played, the position of the playback, e.g., a timestamp, and other data, which are stored in a database 420 for the server 320.

Also shown in FIG. 4 is a listener screen 425, which corresponds to the aforementioned subscriber screen 330 where here the user instead selects to become a listener. As a listener, it should be understood that the listening user has no audio or other control over the content apart from playing or listening. As mentioned, the listening user checks for activity feeds, described in connection with the actions of reference numeral 350. A representative activity feed 430 is illustrated in FIG. 4 with one broadcaster indicated, i.e., the broadcaster in this example. It should, of course, be understood that multiple broadcasters may be listed in the feed 430 for any listener's selection. Here, the listening user selects the aforementioned broadcaster, generally designated by the reference numeral 435, and the requisite data associated with that broadcast is then retrieved 440. Again, the user's activities here are sent on for updating 445 the aforementioned database 420 of the user management server 320.

As discussed, the necessary information for the listener, i.e., the content, is retrieved from the aforementioned multimedia server 345, and the management server 320 retrieves the positioning or syncing data for that content, generally designated by the reference numeral 450, determining the playback position for the listener. As shown, the sync data is forwarded to the user, generally designated by the reference numeral 455. Likewise, the particular content, resident in a multimedia server 460, such as SoundCloud for songs, forwards that content being broadcast on to the user, generally designated by the reference numeral 465. With the requisite information from both servers, the listening client then synchronizes playback for the shared experience.

Also shown in FIG. 4 is some playback functionality offered to the broadcaster. As shown, the broadcast screen 405 has various buttons, e.g., a go back or reverse button 470, a pause or stop/play button 475, and a forward or advance button 480. The button 475 allows the broadcaster to pause the playback of the multimedia and the action is recorded onto the user management server 320. The playback for the listeners is controlled by the broadcaster so that when a broadcaster skips or advances the playback, the device(s) of the listener(s) also skips the playback as well. Similarly, pressing the play button 475 initiates playback on a broadcaster's device, but when paused or stopped, also pauses or stops a listener device, thereby controlling the broadcast.

Figure 5:
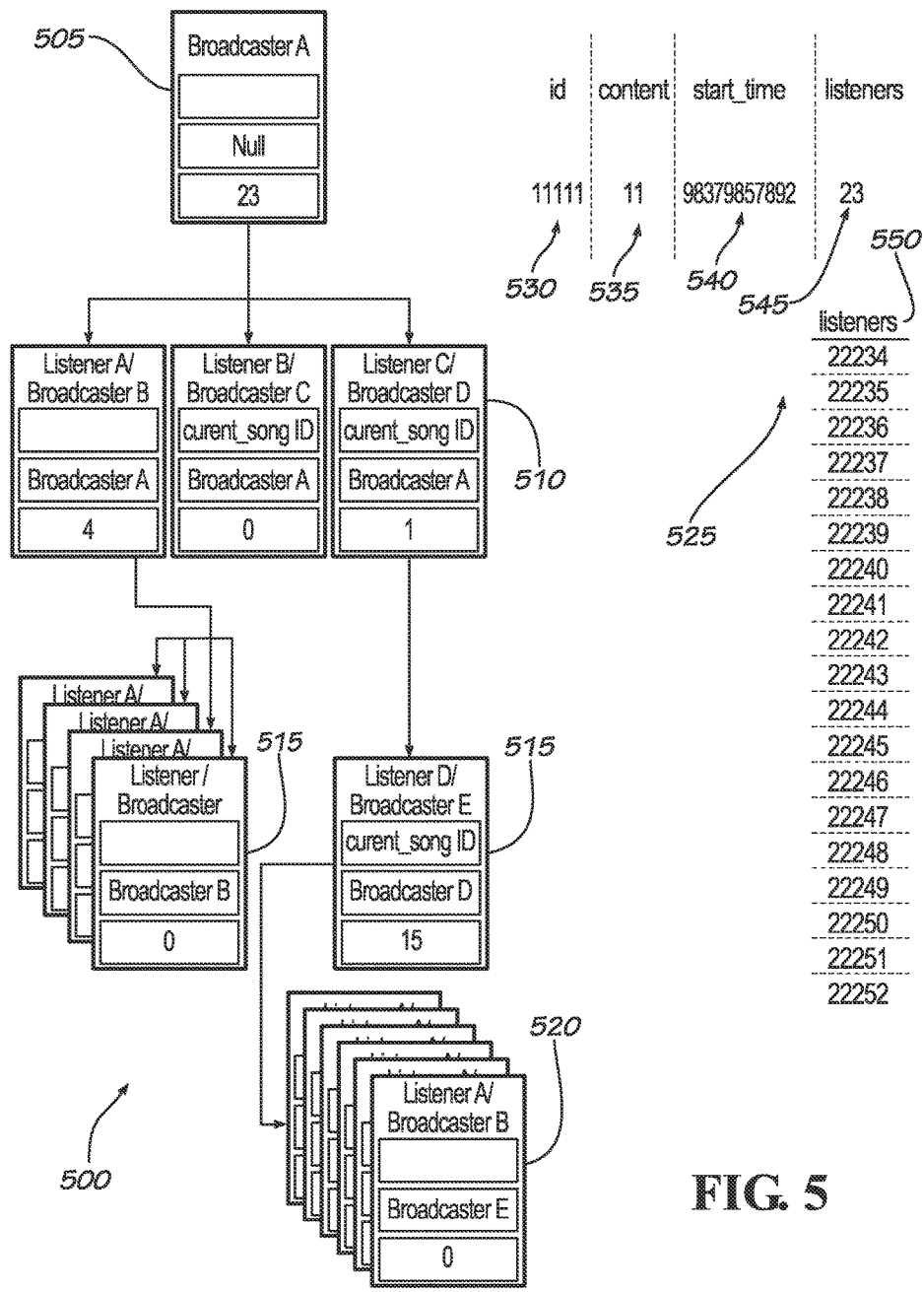
FIG. 5 is a further representative diagram illustrating additional aspects of the present invention, such as chain listening pursuant to the present invention.

With reference now to FIG. 5 of the DRAWINGS, there is illustrated therein an exemplary representation of chain listening features, generally designated by the reference numeral 500, made possible pursuant to the teachings of the present invention. Indeed, the diagram further demonstrates the broadcaster/listener paradigm of the instant invention, albeit on a broader scale with multiple clients listening in parallel. To that point, a single point broadcaster, designated herein as Broadcaster A, has control over the playback of the station, and constitutes the originating station in this example, which is described hereinabove in connection with the broadcaster 405 in FIG. 4. It should be understood that some of the listeners in this example are also broadcasters to their listeners, but the first tier or level of downstream listener/broadcasters, designated generally by the reference numeral 510, and listeners downstream from them cannot control the playback of the multimedia. In connection with broadcaster A, the associated data 505 include the current song (or other content) identifier, such as from SoundCloud, that is playing, an identification of the user being listened to, which is none for originating broadcaster A, and the number of listeners, which is computed by taking the summation of the listeners at the various levels of listening.

As illustrated, two of the three listener/broadcasters 510 have listeners of their own, generally designated by the reference numeral 515, at a second tier or level, and one of these, has a further tier or level of listeners, generally designated by the reference numeral 520. In this manner, multiple levels or tiers of chained listeners can partake of the shared experience.

With reference again to FIG. 5, there is also illustrated a small portion of a database table, generally designated by the reference numeral 525, which represents the server side of the above chaining. It should be understood that the table 525 contains information about each client, e.g., whether they are offline or online. For this example, the client identifier for the broadcaster A is generally designated by the reference numeral 530. Also, an identifier for the particular content, such as a song playing on the broadcaster's device, is designated by the reference numeral 535, and a start time 540 assigned to each client when they become a broadcaster is shown. Finally, the number of listeners that are consuming multimedia from the broadcaster is designated by the reference numeral 545, and the identities of those listeners are also listed, generally designated by the reference numeral 550. It should be understood that the consumption of multimedia is done solely through a multimedia content management server. No multimedia data is transmitted to or between a broadcaster and listener. Each user makes their own separate connections to content and to the syncing data to make the shared experience possible.

Figure 6:
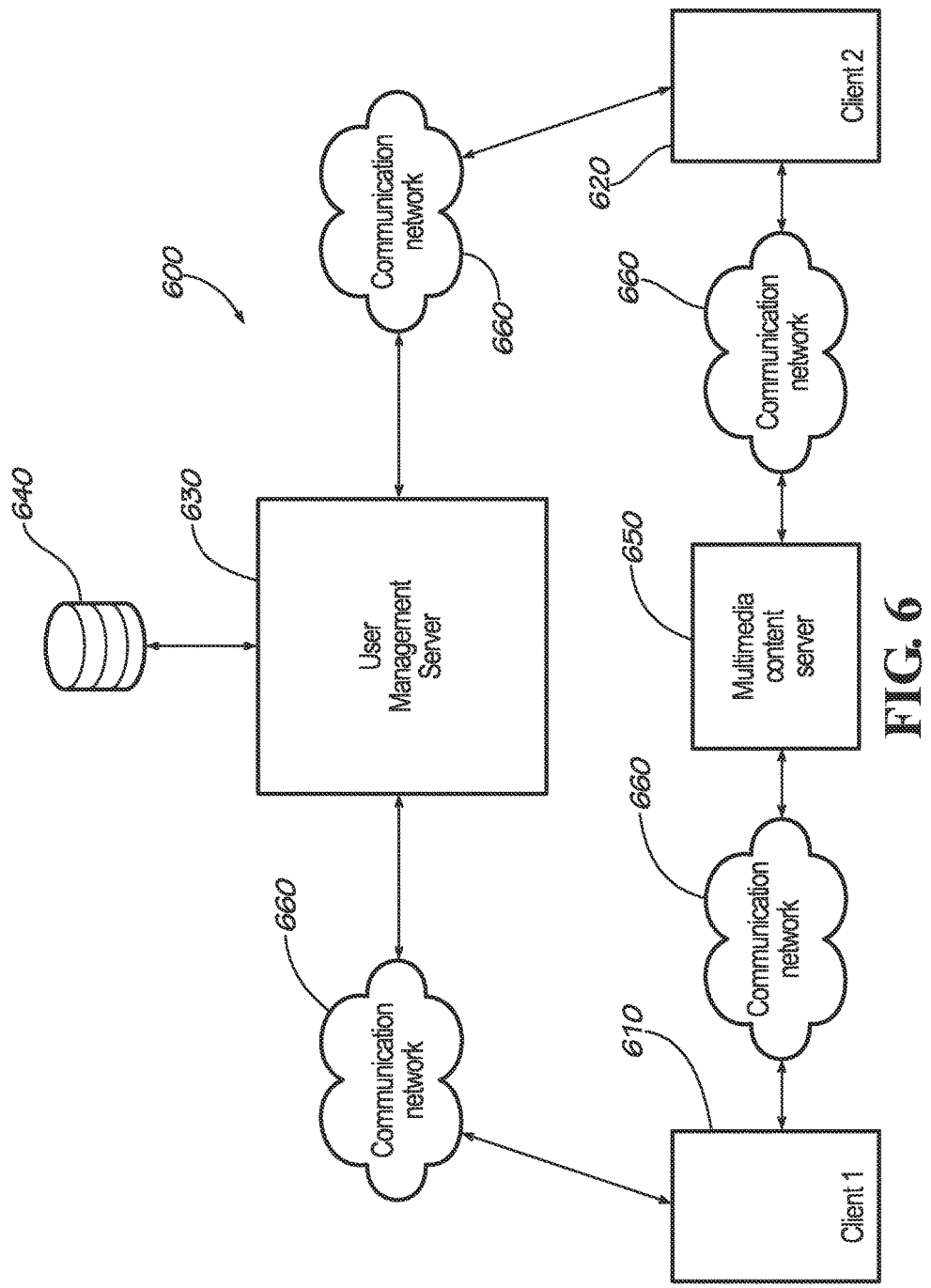
FIG. 6 is another schematic view of a representative communications system for implementing the functionality of the various features of the present invention.

With reference now to FIG. 6 of the DRAWINGS, there is shown a diagram illustrating a system, generally designated by the reference numeral 600, and the relationship between two respective clients, designated generally by the reference numerals 610 and 620, respectively, a user management server 630, associated storage 640, and a multimedia content server 650. Also shown is a telecommunication or communication network, generally designated by the reference numeral 660, by which the aforementioned clients or servers may access the Internet or otherwise communicate. For example, a given network 660 may be cellular data, including 3G/4G/LTE/WiMax network or broadband/dsl/cable/T1 networks. It should further be understood that the communication network 660 may also refer to any networking device or method by which two or more devices can connect to the Internet and communicate between each other.

As also discussed herein and shown in the figures, such as FIG. 1, FIG. 6 further illustrates the role the user management system 630 plays in synchronizing and storing user data. As discussed, the user database 640 is employed by the user management server 630 to enable the synchronization of each client to the correct playback position. Other user related services, such as determining how many broadcasters are available, what content the broadcaster has requested from the multimedia management server, determining if the broadcaster has paused/stopped/or skipped content playback, and user profile data are also stored within the user database 640. Again, content is stored in the preferred embodiment of the present invention with a content provider. However, it should be understood that in an alternate embodiment of the present invention, content that has been approved, authorized, owned or freely available may be made available to all users of the user management server 320 service or portions thereof. Some of this content may be stored in the user management server 320 or the database in this alternate embodiment.

With reference to FIG. 6, an exemplary session will be discussed. Client 610 wishes to become a broadcaster. As discussed, the client must first be authenticated, such as with the multimedia server 460, illustrated and discussed in connection with FIG. 4. Once authenticated, the broadcast client 610 may request content from the multimedia server 460, such as SoundCloud. Thus, all multimedia or other content served to the broadcaster is controlled by the content management server or system 650, and not by the user management server or system 630. It should be understood that the purpose of the user management system 630 is to synchronize and store profile data for each client. Separately, the broadcasting client 610 requests the content or multimedia from the multimedia content server 650, which, if valid, the content is forwarded to the client 610. As discussed, information about that content (identification, start time, etc.) is separately sent on to the user management server 630, which then generates the time stamps and stores the user information updates, as discussed hereinabove, constituting information useful to sync the listener with the broadcaster.

It should, of course, be understood that the types of content and communications possible using the principles of the present inventions are many, and only some of them are illustrated herein. Cameras, still and video, within mobile or other devices or separate, provide live sources for video content, which through a microphone can be accompanied by audio. As discussed, the users can embellish content with other content, such as commentary, text, visual indicia, such as drawings, photos, image files, or any number of other content sources, limited only by the human imagination. Indeed, the instant invention provides a tool and platform for an exponential advancement in social sharing.

It should further be understood that the subscription service aspect of the present invention can be formulated in a variety of manners, e.g., the Freemium model, which offers free basic services and paid premium services, or otherwise. Telecommunications providers would generally welcome the content-rich data streams on their networks and charge these customers accordingly for these enhanced services.

It should also be understood that although conventional services permit the viewing of lists of what others are listening to, e.g., Amazon sends a barcode id of a song to others, these services do not offer or suggest the more novel capabilities herein, i.e., actually listening in or eavesdropping on others making a broadcast, taking the technologies of today to another level of experience.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

We claim:

1. A real-time digital asset synchronization system comprising:
    a broadcast device, a first user of said broadcast device accessing a digital asset from a content server and communicating a content experience via a user server over a communication network, said user server assigning an identifier and at least one time-stamp corresponding to said broadcast device's access of said digital asset;
    at least one listening device, said at least one listening device accessing said content experience of said broadcast device, a second user of said at least one listening device accessing said digital asset from said content server via said user server, said user server assigning said identifier and said at least one time-stamp corresponding to said broadcast device's access of said digital asset to said at least one listening device's access of said digital asset, such that said broadcast device and said at least one listening device experience synchronous access to said digital asset from said content server, said user server configures a plurality of user profiles, each user profile in the plurality of user profiles being configured to control one or more user actions within said content experience, and said user server further updates said plurality of user profiles in response to one or more user actions in real-time.

2. The real-time digital asset synchronization system according to claim 1, wherein a plurality of listening devices and users access said digital asset from said content server via said user server over said communication network, said user server assigning the identifier and the least one time-stamp corresponding to said broadcast device's access of said digital asset to said plurality of listening devices' access of said digital asset, such that said broadcast device and said plurality of listening devices experience synchronous access to said digital asset from said content server.

3. The real-time digital asset synchronization system according to claim 2, wherein said plurality of listening devices and users are in parallel.

4. The real-time digital asset synchronization system according to claim 2, wherein at least one of said listening devices is a broadcaster and listener, whereby a third user accesses said digital asset from said content server via said user server, said user server assigning the identifier and the least one time-stamp corresponding to said broadcast device's access of said digital asset to said third user's access of said digital asset, such that said broadcast device and said third user experience synchronous access to said digital asset from said content server.

5. The real-time digital asset synchronization system according to claim 1, wherein a user, at an entry point to a subscriber service for said real-time digital asset synchronization system, can opt in or out of said content experience.

6. The real-time digital asset synchronization system according to claim 1, wherein a user, at an entry point to a subscriber service for said real-time digital asset synchronization system, can select between being a broadcaster of said content experience or a listener thereof.

7. The real-time digital asset synchronization system according to claim 6, wherein if said user selects becoming a broadcaster, said user then selects content for sharing.

8. The real-time digital asset synchronization system according to claim 7, wherein, upon selection of said content, said user obtains authentication for said content from said content server, which, if granted, is forwarded to a broadcast device.

9. The real-time digital asset synchronization system according to claim 7, wherein said user adds to the content in the content experience.

10. The real-time digital asset synchronization system according to claim 6, wherein if said user selects becoming a listener, said user then selects a broadcaster from an activity feed of broadcasters.

11. The real-time digital asset synchronization system according to claim 10, wherein said user obtains an identification and at least one time-stamp for content being broadcasted by said broadcaster, and, after authentication with said content server with said identification, receives said content from said content server, and, after synchronization with said at least one time-stamp, said user shares said content experience with said broadcaster.

12. The real-time digital asset synchronization system according to claim 10, wherein said plurality of user profiles comprise a user identifier, a content identifier for users dynamically employing content, a time-stamp for the dynamically employed content marking a position therein, and an online/offline indicator.

13. The real-time digital asset synchronization system according to claim 10, wherein said content is selected from the group consisting of music, video, text and combinations thereof.

14. The real-time digital asset synchronization system according to claim 1, wherein said broadcast device and said at least one listening device are selected from the group consisting of a mobile device, a smartphone, a tablet, a desktop device, a personal computer and display devices attached thereto.

15. A user server comprising:
- a plurality of user profiles, said user profiles including profiles of a first and a second user, said first user profile configured to access a digital asset from a content server and communicate a content experience via a user server over a communication network, said user server assigning an identifier and at least one time-stamp corresponding to said first user profile's access of said digital asset, said user server configures a plurality of user profiles, each user profile in the plurality of user profiles being configured to control one or more user actions within said content experience, said user server further updates said plurality of user profiles in response to one or more user actions in real-time;
- said user profile of said first user containing an identifier of said at least one content, said at least one content resident on a content server in communication with said user server, and a time-stamp for said digital asset; and,
- said second user accessing said digital asset from said content server via said user server, said user server assigning the identifier and the least one time-stamp to said second user, such that said first user and said second user experience synchronous access to said digital asset from said content server;
- a synchronizer, said synchronizer synchronizing said at least one content at said second user to the content experience of said first user using said identifier and said time-stamp, whereby said second user shares the content experience with said first user.

16. A content sharing method comprising:
- accessing, by a first user, a digital asset from a content server via a user server, said user server assigning an identifier and at least one time-stamp corresponding to said first user's access of said digital asset;
- configuring, with said user server, a plurality of user profiles, each user profile in the plurality of user profiles being configured to control one or more user actions within a real-time shared content experience, and said user server updates said plurality of user profiles in response to one or more user actions in real-time;
- broadcasting, by said first user via said user server over a communication network, a content experience including at least one content;
- accessing, by a second user via said user server over said communication network, said content experience of said first user, said second user retrieving said identifier for said digital asset and at least one time-stamp therefor from said user server, said at least one time-stamp corresponding to said first user's access to said digital asset;
- accessing, by said second user, said digital asset from said content server via said user server over said communication network, said user server assigning said identifier and said least one time-stamp to said second user's access of said digital asset; and,
- synchronizing, using said identifier and said at least one time-stamp from said user server, digital asset from said content server at said second user to content experience of said first user, thereby creating a real-time shared content experience.

\* \* \* \* \*